United States Patent
Daniel et al.

(10) Patent No.: US 8,762,214 B1
(45) Date of Patent: Jun. 24, 2014

(54) CONFIGURATION BASED HIERARCHICAL PRODUCT SELECTION AND PRODUCT E-COMMERCE AGENT MANAGEMENT

(75) Inventors: Christopher J. Daniel, Santa Clara, CA (US); Norbert A. Kordsmeier, Mountain View, CA (US); Randolph S. Reynolds, IV, Campbell, CA (US); Elizabeth H. Austin, San Jose, CA (US); Eric Henze, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 1010 days.

(21) Appl. No.: 11/599,660

(22) Filed: Nov. 14, 2006

(51) Int. Cl.
*G06Q 30/00* (2012.01)
(52) U.S. Cl.
USPC .................................. 705/26.1; 705/27.1
(58) Field of Classification Search
USPC .................................................. 705/26, 27
See application file for complete search history.

(56) References Cited

U.S. PATENT DOCUMENTS

| | | | | |
|---|---|---|---|---|
| 5,515,524 | A * | 5/1996 | Lynch et al. | 703/13 |
| 5,708,798 | A * | 1/1998 | Lynch et al. | 703/1 |
| 6,405,308 | B1 * | 6/2002 | Gupta et al. | 713/1 |
| 7,337,179 | B1 * | 2/2008 | Plain | 1/1 |
| 7,505,921 | B1 * | 3/2009 | Lukas et al. | 705/26 |
| 7,584,079 | B2 * | 9/2009 | Lichtenberg et al. | 703/2 |
| 7,603,367 | B1 * | 10/2009 | Kanter et al. | 1/1 |
| 2002/0073001 | A1 * | 6/2002 | Palmer et al. | 705/29 |
| 2002/0147656 | A1 * | 10/2002 | Tam et al. | 705/26 |
| 2002/0165701 | A1 * | 11/2002 | Lichtenberg et al. | 703/7 |
| 2006/0178864 | A1 * | 8/2006 | Khanijo et al. | 703/20 |
| 2007/0028189 | A1 * | 2/2007 | Robbins | 715/853 |
| 2009/0089174 | A1 * | 4/2009 | Brunner et al. | 705/26 |

OTHER PUBLICATIONS

PR Newswire: Kingston Technology Launches its White Box Pavilion and Motherboard Compatibility Program to System Builders and Integrators,: PR Newswire, Aug. 26, 2002; PQDialog #447477100, 3pgs.*
Business Wire: "Kaypro Forms Alliance with Kingston Technology for Memory Configurator E-Commerce Enhancement," Business Wire, Jun. 1, 2000; PQDialog #445953022, 3pgs.*

* cited by examiner

*Primary Examiner* — Rob Pond

(57) ABSTRACT

A method for hierarchical product selection and purchasing from a server. The method includes accessing a plurality of products from a plurality of component subareas, wherein the products are for an assembly of a computer system, and wherein each of the component subareas have corresponding compatibility constraints with respect to other component subareas. A hierarchical presentation of the products is generated, wherein the presentation proceeds from a parent product out of the plurality of products to a child product out of the plurality of products. The hierarchical presentation of the products are provided to a client computer system via a Web browser hosted on the client computer system, wherein the presentation is configured to show child component subareas that satisfy compatibility restraints with parent component subareas. An order for the at least one product is accepted and implemented with a corresponding e-commerce agent for the product.

20 Claims, 18 Drawing Sheets

CONFIGURATION BASED HIERARCHICAL PRODUCT SELECTION AND PRODUCT E-COMMERCE AGENT MANAGEMENT

FIELD OF THE INVENTION

The field of the present invention pertains to the management of electronic commerce operations on a distributed computer network. More particularly, the present invention relates to a method and system for implementing of component shopping in an electronic commerce retail operation.

BACKGROUND OF THE INVENTION

In the world of online commerce, buyers and sellers use a variety of techniques to ensure goods and services meet their mutual expectations. For example, many users have become familiar with the electronic retail experience through a multitude of different e-commerce agents.

Many users have purchased products from companies that specialize in providing products or services directly to customers. Such companies are typically referred to as direct sellers. In general, there are two types of direct sellers: electronic retailers or "e-tailers" and manufacturers. A direct seller refers to those companies whereby, upon receiving an order, the e-tailer ships products directly to the consumer or to a wholesaler or manufacturer for delivery. A manufacturer sells directly to consumers via the interne. For the manufacturer, the goal is to remove intermediaries (e.g., disintermediation) and to establish direct customer relationships.

Online intermediaries provide another type of electronic retail experience to customers. Online intermediaries are companies that facilitate transactions between buyers and sellers. These firms make up the largest group of B2C (business to consumer) companies today. Generally, the most common type of online intermediary are brokers. A broker is a company that facilitates transactions between buyers and a variety of different sellers. For example, a virtual mall typically refers to a broker company that helps consumers buy from a variety of different online stores.

With each of these electronic retail providers, advantages are afforded to the customer with respect to enabling the online shopping experience to be executed faster and with more convenience. Product offerings and prices can be updated immediately to reflect certain sales or deals. Other advantages include the fact that, in some cases, call centers can be integrated with the website. Additionally, the widespread adoption of broadband telecommunications will further enhance the overall buying experience.

There exists a problem however, with respect to the customer online commerce experience for purchasing specialized components for complex systems. Home-built desktop computer systems comprise one such specialized system.

Home built, or do it yourself, computer systems refer to those computer systems whereby the individual components comprising the computer system are purchased by the customer from one or more sources. The sources can be the neighborhood electronics store, but are more often online electronic retailers. The components are then assembled by the customer into a complete computer system. Such components include, for example, computer system motherboards, system memory, CPUs, graphics cards, hard drives, computer system cases/chassis, displays, and the like.

Computer systems are complex systems. The complexity stems from the fact that to achieve a desired level of suitability for a particular purpose, or to achieve a desired level of overall performance, certain components are only compatible with a distinct subset of the total available components that might be present on the marketplace. For example, certain motherboards are only compatible with certain types of system memory. Certain graphics cards are only compatible with certain types of motherboards. Certain CPUs are only compatible with certain types of system memory and/or motherboards. Certain CPU-motherboard-graphics card combinations require certain power supplies, which in turn require certain system chassis. Such compatibility constraints apply to virtually each of the components that make up a desktop computer system.

The increasing popularity of computer systems and their use in graphics based applications such as video editing, gaming, and the like has given rise to a new class of customers that prefer to build their own computer system (e.g., do-it-yourself buyers). These customers embrace the challenge of selecting the various components that go into making their computer systems.

A significant number of such potential do-it-yourself customers, however, may not have the skill to implement, or may be intimidated by, the selection/buying process. A significant number of the potential do-it-yourself buyers would very much like to exercise the personal discretion inherent in the selection and purchasing of the individual components making up their computer system, but are otherwise inclined to avoid the process. Such buyers may fall back on more traditional purchases from, for example, OEM system builders in order to avoid making mistakes.

Thus, what is required is an electronic-commerce method and system that provides the benefits of purchasing specialized components for complex systems, such as home building a desktop computer system, while avoiding the potential pitfalls of making mistakes in the component selection process. Embodiments the present invention provide a novel solution to the above requirement.

SUMMARY OF THE INVENTION

Embodiments of the present invention provide an electronic-commerce method and system that gives customers the benefits of purchasing specialized components for complex systems, such as home building a desktop computer system, while avoiding the potential pitfalls of making mistakes in the component selection process.

In one embodiment, the present invention is implemented as a method for hierarchical product selection and purchasing from a server. The method includes accessing a plurality of products from a plurality of component subareas, wherein the products are for an assembly of a computer system, and wherein each of the component subareas (e.g., motherboard core logic chip set) have corresponding compatibility constraints with respect to other component subareas (e.g., CPU type). A hierarchical presentation of the products is generated, wherein the presentation proceeds from a parent product out of the plurality of products to a child product out of the plurality of products. The hierarchical presentation of the products are provided to a client computer system via a Web browser hosted on the client computer system, wherein the presentation is configured to show child component subareas that satisfy compatibility restraints with parent component subareas. An order for the at least one product is accepted and implemented with a corresponding e-commerce agent for the product.

In one embodiment, the e-commerce agent is an electronic retailer. Alternatively, the e-commerce agent can be an electronic retailer/broker. The component subareas can comprise, for example, motherboards, graphics cards, CPUs, and/or the like. In one embodiment, the presentation provided via the Web browser includes descriptive information regarding the parent component and a highlighted one of a plurality of child components that are compatible with the parent component. The descriptive information can include, for example, performance information, e-commerce agent inventory information, and price information. The descriptive information can further include a link for accepting the order for the highlighted child component.

In this manner, embodiments of the present invention provide an electronic-commerce method and system that gives customers the benefits of purchasing specialized components for complex systems such as desktop computer systems, while avoiding the potential pitfalls of making mistakes in the component selection process. Multiple e-commerce agents can be directly compared to find the best inventory availability, the best warranty, the best price, or the like. For example, a computer system can be specifically configured to provide high-performance, or alternatively, an economical price while preventing the user from making any component miss-choices or miss-selections and while not requiring the customer to perform extensive research or enlist the help of more technically minded friends.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
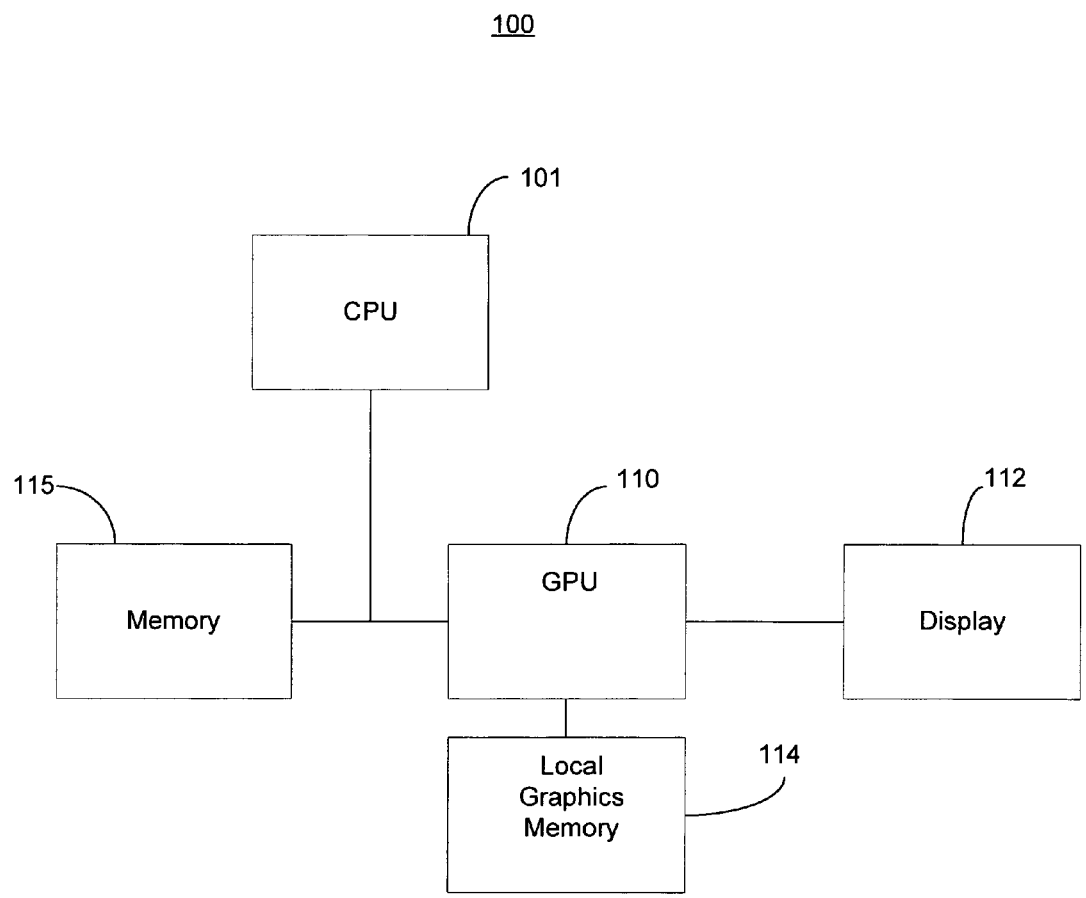
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Embodiments of the Invention:

Embodiments of the present invention provide a method and system for hierarchical product selection and purchasing from a server. The method includes accessing a plurality of products from a plurality of component subareas, wherein the products are for an assembly of a computer system, and wherein each of the component subareas have corresponding compatibility constraints with respect to other component subareas. A hierarchical presentation of the products is generated, wherein the presentation proceeds from a parent product out of the plurality of products to a child product out of the plurality of products. The hierarchical presentation of the products is presented via a Web browser interface on a user's client computer system, wherein the presentation is configured to show child component subareas that satisfy compatibility restraints with parent component subareas. Web browser interface can accept orders for the products and implement the orders with corresponding e-commerce agents for the product. Embodiments in the present invention and their benefits are further described below.

Figure 2:
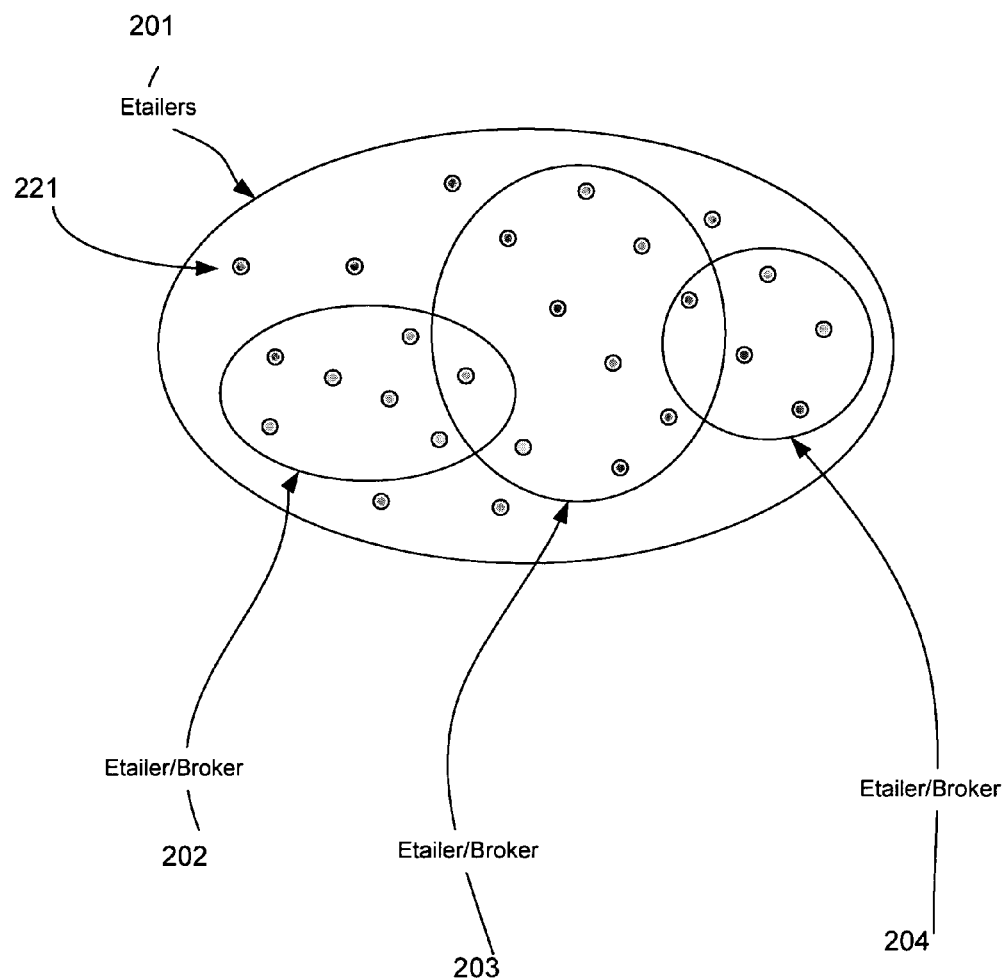
FIG. 2 shows a diagram illustrating an exemplary set of electronic retailers that are used to provide the configuration based product selection and purchasing in accordance with one embodiment of the present invention.

FIG. 2 shows a diagram illustrating an exemplary set of electronic retailers 201 that are used to provide the configuration based product selection and purchasing in accordance with one embodiment of the present invention. As depicted in FIG. 2, the set of electronic retailers 201 is comprised of a plurality of individual electronic retailers, which are illustrated as the plurality of small circles (e.g., such as the exemplary electronic retailer 221) within the set 201. Each of these electronic retailers maintains an e-commerce storefront that typically has a plurality of different products for sale. The electronic retailers can either be direct sellers or manufacturers, or the like.

Out of the set of electronic retailers 201, three exemplary subsets of electronic retailers 202-204 are shown. The subsets 202-204 represent three different exemplary electronic retailer/brokers. Electronic retailer/brokers function as brokers that facilitate transactions between buyers and the different sellers. For example, the electronic retailers/brokers 202-204 function is intermediaries that facilitate transactions between buyers shopping for different components and the electronic retailers that stock and sell those different components.

In one embodiment, the electronic retailers 201 provide a plurality of different computer components for sale to customers. Such computer components can be browsed, selected, and purchased by customers and provide virtually all of the components required to assemble a complete computer system. Such computer systems can be desktop computer systems, small form factor computer systems, laptop computer systems, television set-top console systems, and the like.

The various different components sold by electronic retailers 201 allow a variety of different computer system configurations to be built. For example, a customer can select and purchase high-performance graphics components (e.g., one or more high-performance graphics cards) and a motherboard equipped with a high-performance core logic chipset to build a computer system having exceptionally high graphics performance (e.g., for games, video editing, graphics applications, etc.). Similarly, the customer can select and purchase low-cost components to build a computer system on a comparatively low budget.

The customer needs to exercise care when purchasing products to assemble a home built, or do it yourself, computer system, regardless of the specific performance niche the computer system is to fulfill. For example, regardless of whether the computer system is to be a high-performance gaming computer system or an economical wordprocessing/office software executing computer system, the individual components that make up the overall computer system must be selected such that they are compatible with one another. For example, motherboards need to be selected that match the appropriate CPU type, system memory needs to be selected that matches the motherboard and CPU type, a graphics card may or may not be required, a discrete graphics card may or may not even be compatible with a given motherboard, and the like. Embodiments of the present invention provide an electronic-commerce method and system that gives customers the benefits of purchasing specialized components for complex systems such as home built computer systems, while avoiding the potential pitfalls of making mistakes in the component selection process.

Figure 3:
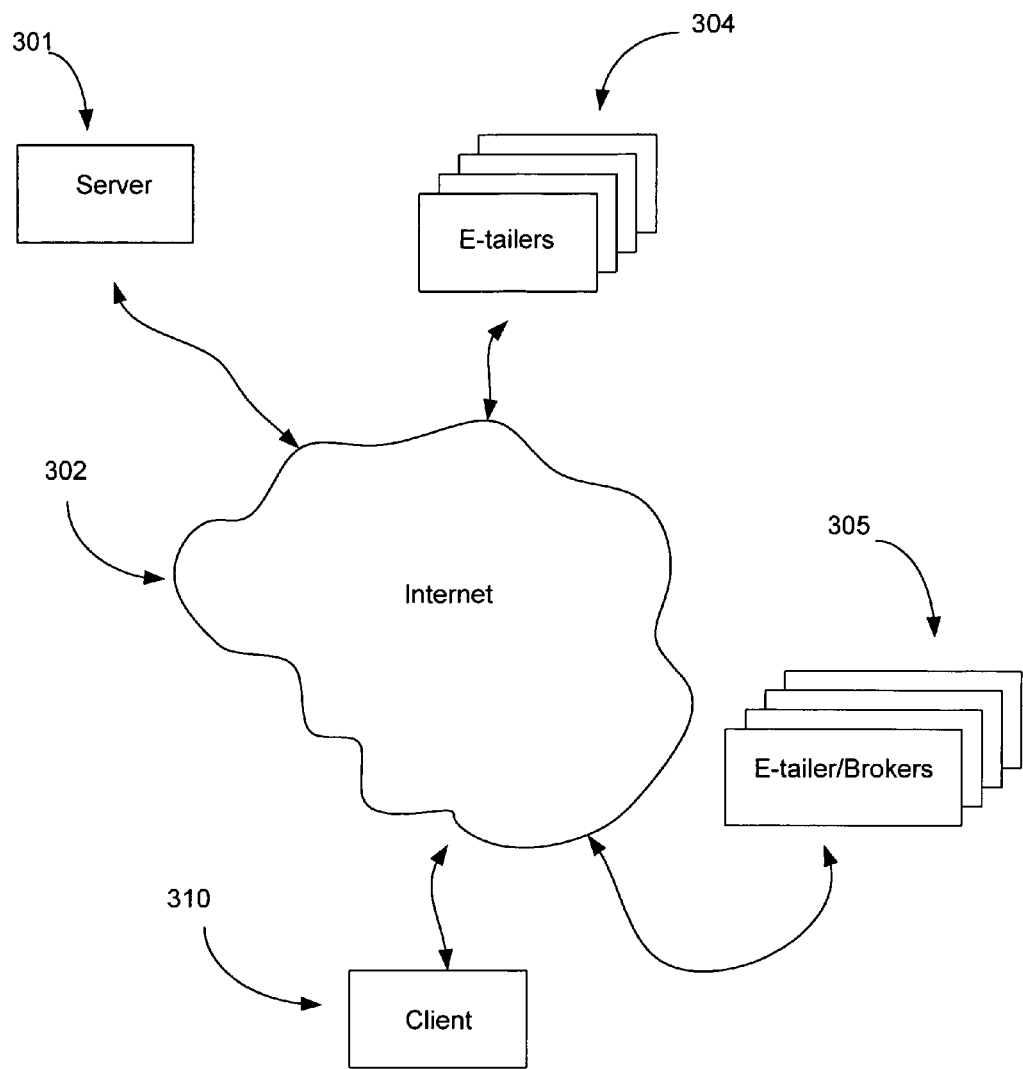
FIG. 3 shows a server that hosts the software-based functionality of embodiments of the present invention.

FIG. 3 shows a server 301 that hosts the software-based functionality of embodiments of the present invention. As depicted in FIG. 3, the server 301 is connected to the Internet (e.g., a distributed computer network) which in turn connects to a plurality of different electronic retailers 304 and a plurality of different electronic retailer/brokers 305. The server 301 is also connected to a client computer system 310 via the Internet 302.

In one embodiment, the server-based method comprises accessing the number of different electronic retailer/brokers 305. As described above, embodiments of the present invention are implemented as an electronic-commerce method that is implemented as computer software code (e.g., a Web serving application, etc.) executing on one or more server(s) 301. The server 301 accesses a plurality of different products offered for sale from a plurality of different component subareas. As described above, in one embodiment, these components are components for the assembly of a computer system (e.g., motherboards, system memory, hard drives, graphics cards, etc.).

The server 301 compiles a list of the products that are offered for sale by electronic retailer/brokers 305. In one embodiment, the server 301 accesses the electronic retailer/brokers 305 via specialized APIs (application programming interfaces) that are provided by each of the electronic retailer/brokers 305. The APIs provide an efficient means of accessing internal databases maintained by each of the electronic retailer/brokers 305 and pulling product information therefrom (e.g., product description, inventory information, price information, shipping information, etc.).

Accessing the electronic retailers/brokers 305 provides an additional advantage in comparison to accessing the individual electronic retailers 304. Example electronic retailer/brokers include Yahoo Shopping®, Amazon.com®, Froogle®, and the like. By accessing the electronic retailers/brokers 305, the server 301 can take advantage of the product information collection that has already been performed by each of the electronic retailer/brokers individually. For example, as described above in the discussion of FIG. 2, each of the electronic retailer/brokers function as an intermediary between a plurality of electronic retailers and the large number of customers that browse the electronic retailer/broker's web site. Each of the electronic retailer/brokers 305 scrapes or otherwise obtains product information from the various electronic retailers 304. This product information describes the various products each electronic retailer has for sale (e.g., product description, inventory information, price information, shipping information, etc.). The electronic retailer broker then populates its own web site with this product information and creates its own unique web storefront "look and feel" for visiting customers/shoppers.

Thus, by accessing the electronic retailer/brokers 305 to obtain product information, embodiments of the present invention can compile product information from a large cross-section of the electronic retailers 304 without having to visit each one of them individually. Additionally, the product information can be obtained efficiently since the server 301 accesses the electronic retailer/brokers 305 via their individual API.

Figure 4:
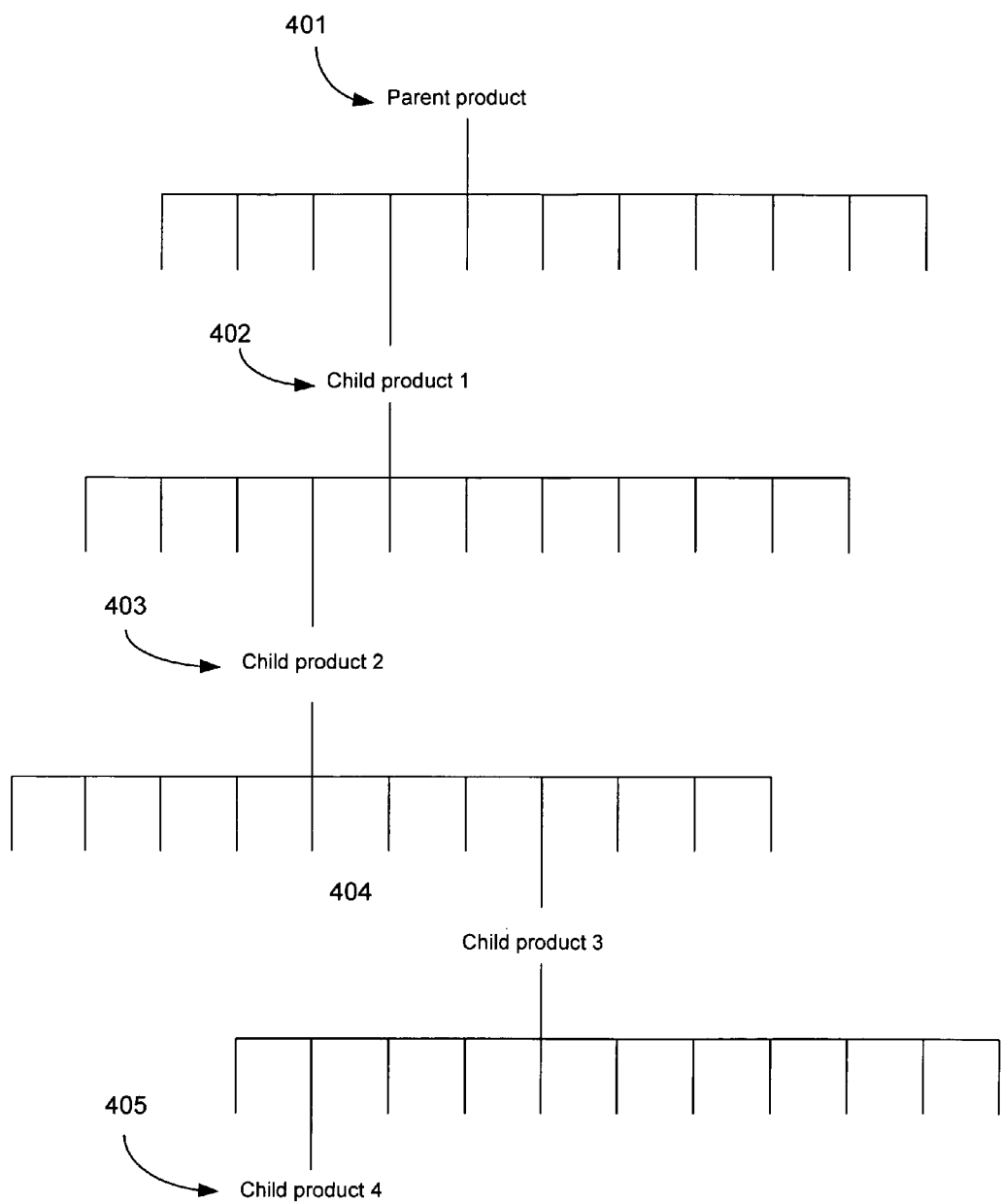
FIG. 4 shows a hierarchical product selection diagram illustrating a hierarchical product relationship in accordance with one embodiment of the present invention.

FIG. 4 shows a hierarchical product selection diagram illustrating a hierarchical product relationship in accordance with one embodiment of the present invention. As depicted in FIG. 4, a parent product is shown which leads to the selection of a plurality of child products 402-405.

In the FIG. 4 embodiment, each of the plurality of products have corresponding compatibility constraints with respect to their various component subareas. For example, as described above, were the family of products are for an assembly of a home built computer system, a motherboard has compatibility constraints with respect to other components (e.g., CPU type, graphics card, disk drive, etc.). Embodiments of the present invention utilize a hierarchical relationship to illustrate the compatibility constraints between different components and/or component subareas.

In one embodiment, the server 305 executes a software application that guides a user (e.g., via client 310) in the purchase of components used to assemble the computer system (e.g., a desktop computer system). In this embodiment, the application would prompt the user to specify a parent product. The parent product is considered as the foundation of the computer system and the product to which the subsequent child products are chosen in order to satisfy certain compatibility constraints.

In one embodiment, the parent product 401 is a motherboard, or more specifically, for example, a motherboard core logic chipset. A user can be prompted through a series of choices that identifies the intended use of the home built computer system, desired performance level of the computer system, or the like, to assist the user in narrowing down a range of choices of different motherboards. The motherboards include subcomponents, such as core logic chipsets, that constrain the available choices of child products. FIG. 4 shows 11 possible choices extending from the parent product 401 and each child product 402-403, although should be noted that a fewer or larger number of choices can exist depending upon the type of product.

Continuing the above example, once the user selects the desired motherboard 401, the user is prompted to select the first child product 402. For example, in a case where the first child product 402 is a CPU, the CPU 402 must be chosen that is compatible with the motherboard 401. The choice of the CPU 402 and the motherboard 401 leads to the choice of the particular child product 403, which can be, for example, a computer system chassis. This leads to the choice of the child product 404, which can be, for example, the graphics card that is compatible with the earlier choices, and which leads to the choice of the child product 405, which can be, for example, the power supply for the computer system.

In each case, the server 305 guides the user selections such that the user is prevented from making incompatible choices between the different components and/or subcomponents. For example, depending upon the choice of the parent product 401, only those child products that are compatible with the selected parent product 401 are shown as available choices to the user, and so on.

Figure 5:
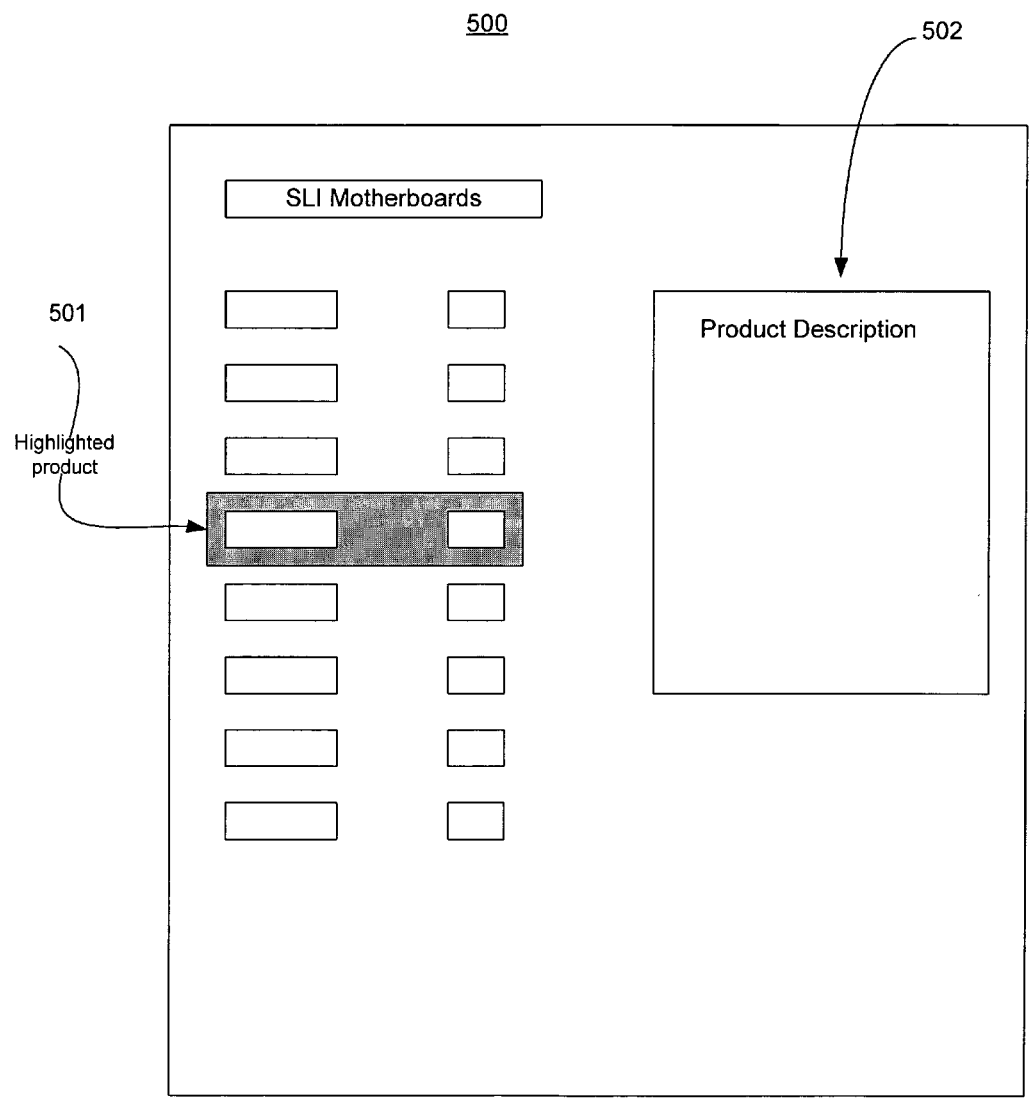
FIG. 5 shows a diagram illustrating an exemplary web page display as seen by a user when interacting with the server via a Web browser in accordance with one embodiment of the present invention.

FIG. 5 shows a diagram illustrating an exemplary web page display 500 as seen by a user when interacting with the server 305 via a Web browser on the client 310 in accordance with one embodiment of the present invention. The web page display 500 shows an example where information regarding the parent product can be presented with respect to each of the possible child products. For example, in a case where a user is shopping for different types of multi-GPU motherboards (e.g., SLI® motherboards based on core logic chipsets from the NVIDIA Corporation, of Santa Clara Calif.) the web page display 500 can show a list of multi-GPU motherboards that have the selected core logic chip set and allow the user to browse between them. For example, the user can highlight one of the list of motherboards having the selected core logic chip set (e.g., product 501) and view descriptive information regarding the highlighted product (e.g., the product description 502).

The descriptive information can include, for example, a description of the performance level of the motherboard, its price, the particular subcomponents included therein (e.g., core logic chip set), which electronic retailers have the motherboard in stock, the price of the motherboard, and the like. Additional descriptive information can include, for example, the shipping terms of the motherboard, links to other web sites that have reviews of the motherboard, links to a web site that executes a purchase of the motherboard (e.g., a "buy this product" button), links to a particular electronic retailer that carries the motherboard, or the like.

In this manner, the user is efficiently and informatively guided through a selection process for the various components required to build the computer system. At each step, or alternatively after all the components of been selected, the user is presented with the option of executing one or more purchases of the selected components directly through the display 500. In one embodiment, the purchase order is implemented by the server 305 directly placing the order with a corresponding electronic retailer. This electronic retailer can be suggested by the server 305 or can be user chosen chosen from a list of available electronic retailers that carry the product. Alternatively, the server 305 can directly place the order with a corresponding electronic retailer/broker.

Figure 6:
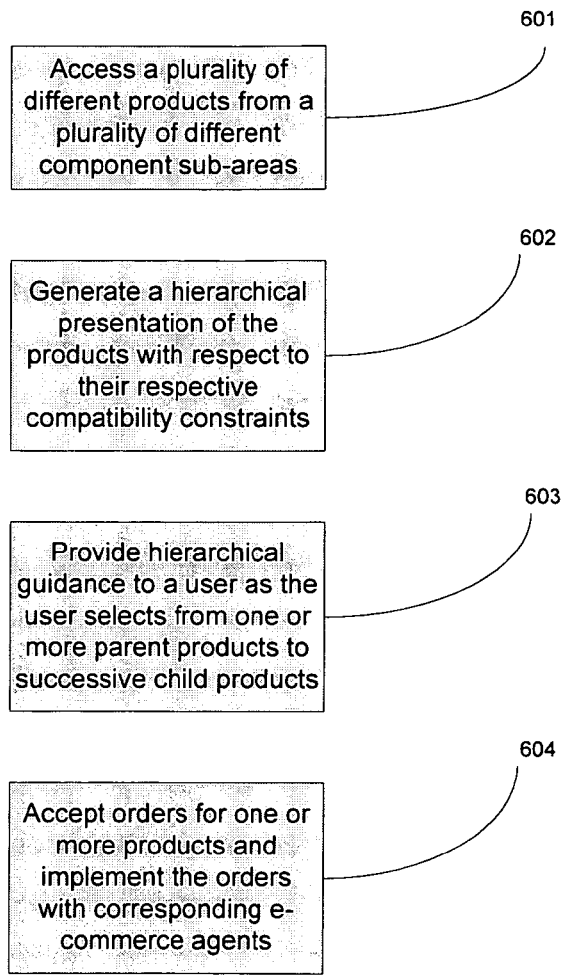
FIG. 6 shows a flowchart of the steps of a guided configuration based product selection process in accordance with one embodiment of the present invention.

FIG. 6 shows a flowchart of the steps of a guided configuration based product selection process 600 in accordance with one embodiment of the present invention. As depicted in FIG. 6, process 600 shows the steps of an exemplary product selection process as guided by a web server executing a guide software application.

Process 600 begins in step 601, where a server-based software application accesses a plurality of different products from a plurality of different component subareas. As described above, in one embodiment, the plurality of products are various products for an assembly of a computer system, and each of the component subareas have corresponding compatibility constraints with respect to other component subareas (e.g., CPU, motherboard, memory, etc.).

In one embodiment, the server (e.g., server 301 of FIG. 3 above) compiles a list of the products that are offered for sale by a plurality of electronic retailer/brokers. As described above, in one embodiment, the electronic retailer/brokers can be accessed via specialized APIs that provide an efficient means of accessing internal databases maintained by each of the electronic retailer/brokers and pulling product information therefrom.

In step 602, a hierarchical presentation of the products is generated with respect to the respective compatibility constraints of each of the products. In one embodiment, as described above, the presentation can proceed from one or more parent products to one or more child products out of the plurality of products.

In step 603, the server-based software application provides hierarchical guidance to a user as the user selects one or more parent products to successive child products. As described above, the hierarchical presentation of the products is presented via a client side Web browser interface that shows child component subareas that satisfy compatibility restraints with parent component subareas.

In step 604, the server-based software application accepts orders for one or more of the products and implements the orders with corresponding e-commerce agents for the product(s). As described above, the orders are placed through, for example, a Web browser interface on a user's client computer.

With reference now to FIG. 7 through FIG. 18, a plurality of exemplary screen depictions are shown that illustrate a Web browser user interface presented to a user as the user interacts with the process 600 server-based software application. In the below examples, the user is selecting products to build a desktop computer system.

Figure 7:
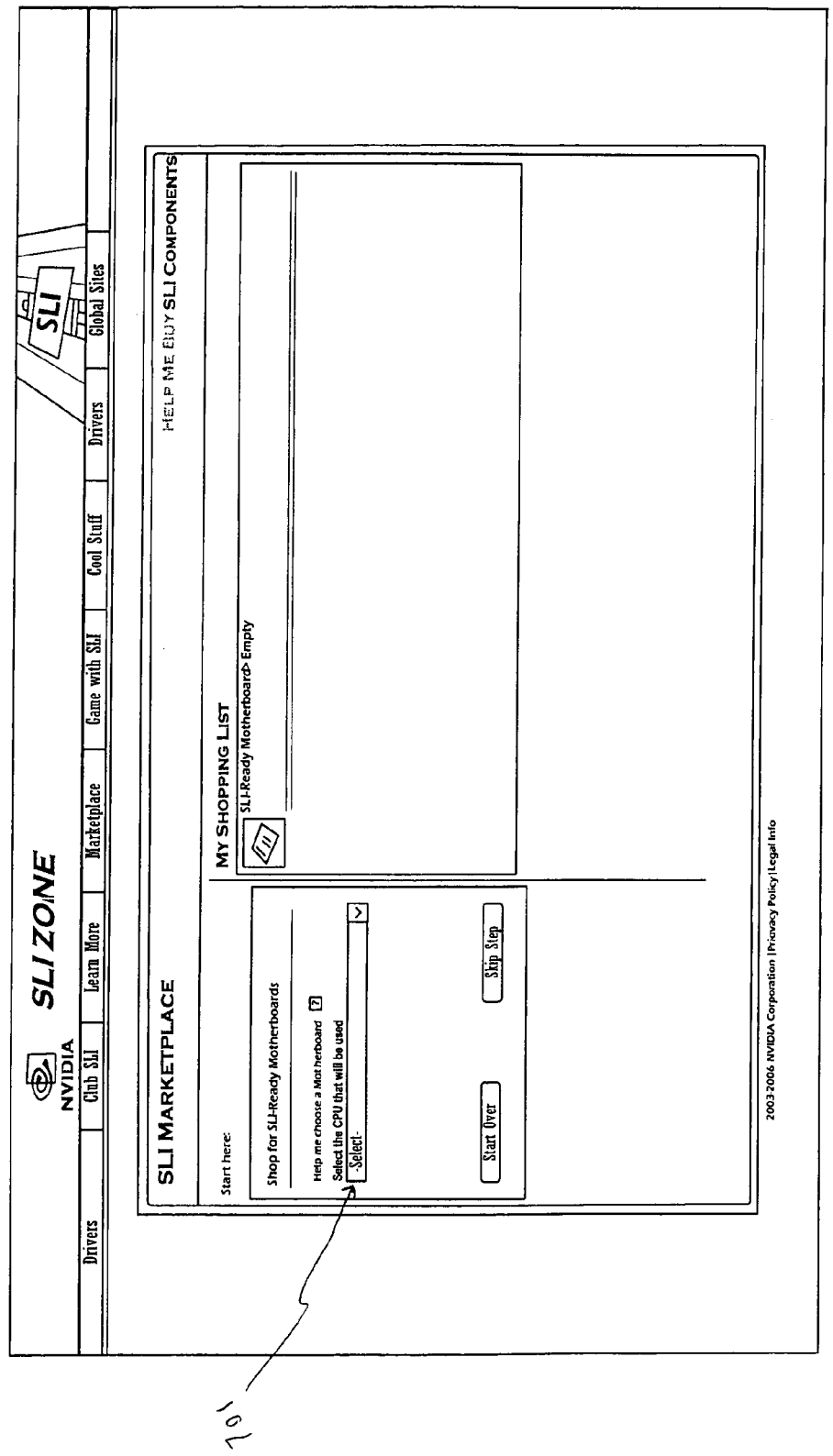
FIG. 7 shows a beginning screen presented by a Web browser user interface in accordance with one embodiment of the present invention.
Figure 8:
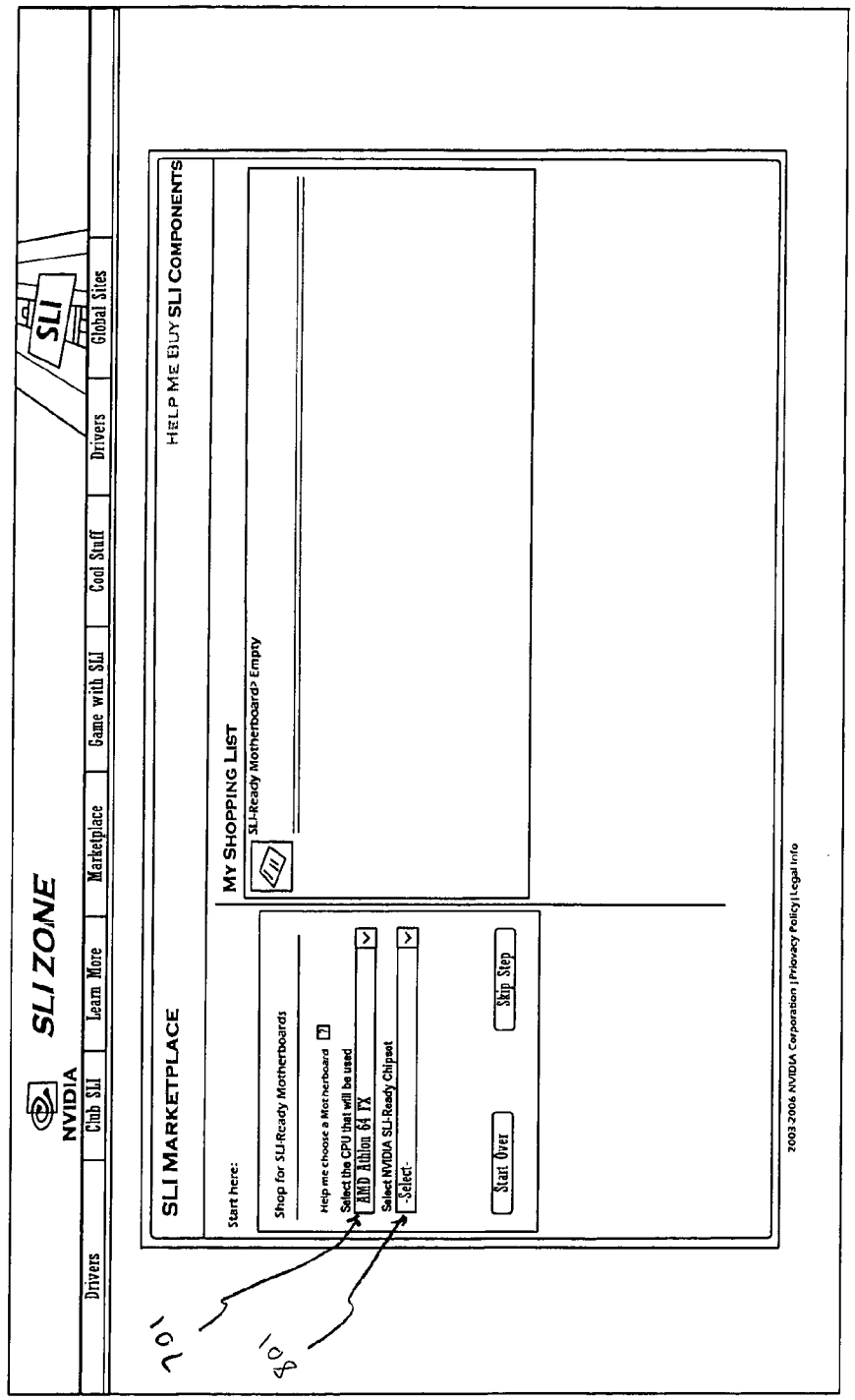
FIG. 8 shows the CPU chosen and the subsequent presentation of a first child component in accordance with one embodiment of the present invention.
Figure 9:
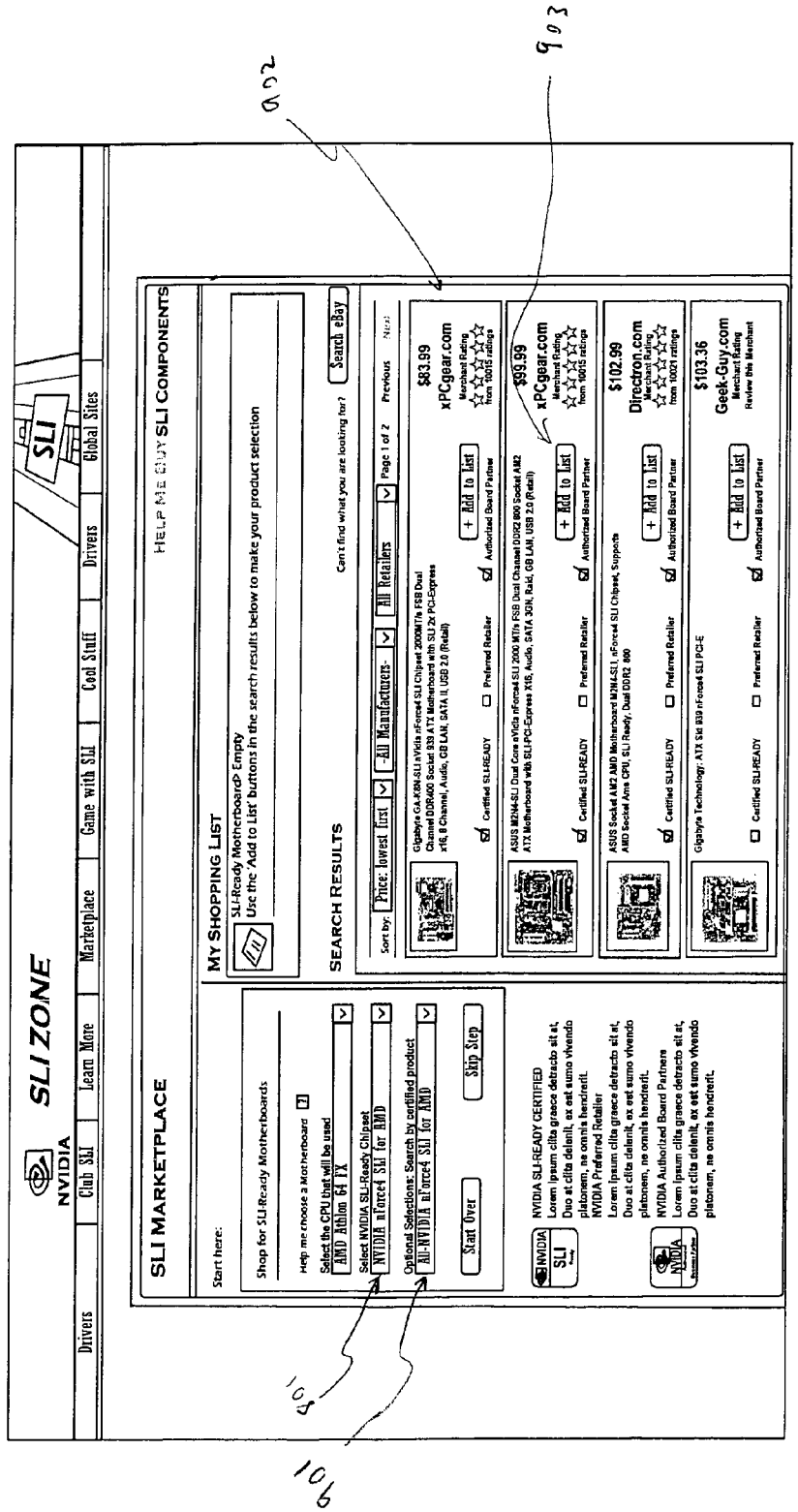
FIG. 9 also shows the results whereby a user can now compare different products, electronic retailers, product prices, and the like, in accordance with one embodiment of the present invention.

FIG. 7 shows a beginning screen presented by a Web browser user interface. The input box 701 provides a starting point for the process 600 whereby, in this example, the user selects the CPU upon which the computer system will be based. FIG. 8 shows the CPU 701 chosen and the subsequent presentation of a child component, in this case, the particular chipset (e.g., input box 801) that is compatible with the chosen CPU. FIG. 9 shows the chipset 801 chosen and the subsequent presentation of a motherboard having the chosen chipset (e.g., input box 901). FIG. 9 also shows the results 902 whereby the user can now compare different products, electronic retailers, product prices, and the like. Selected components can also be saved to a shopping list by buttons (e.g., button 903).

Figure 10:
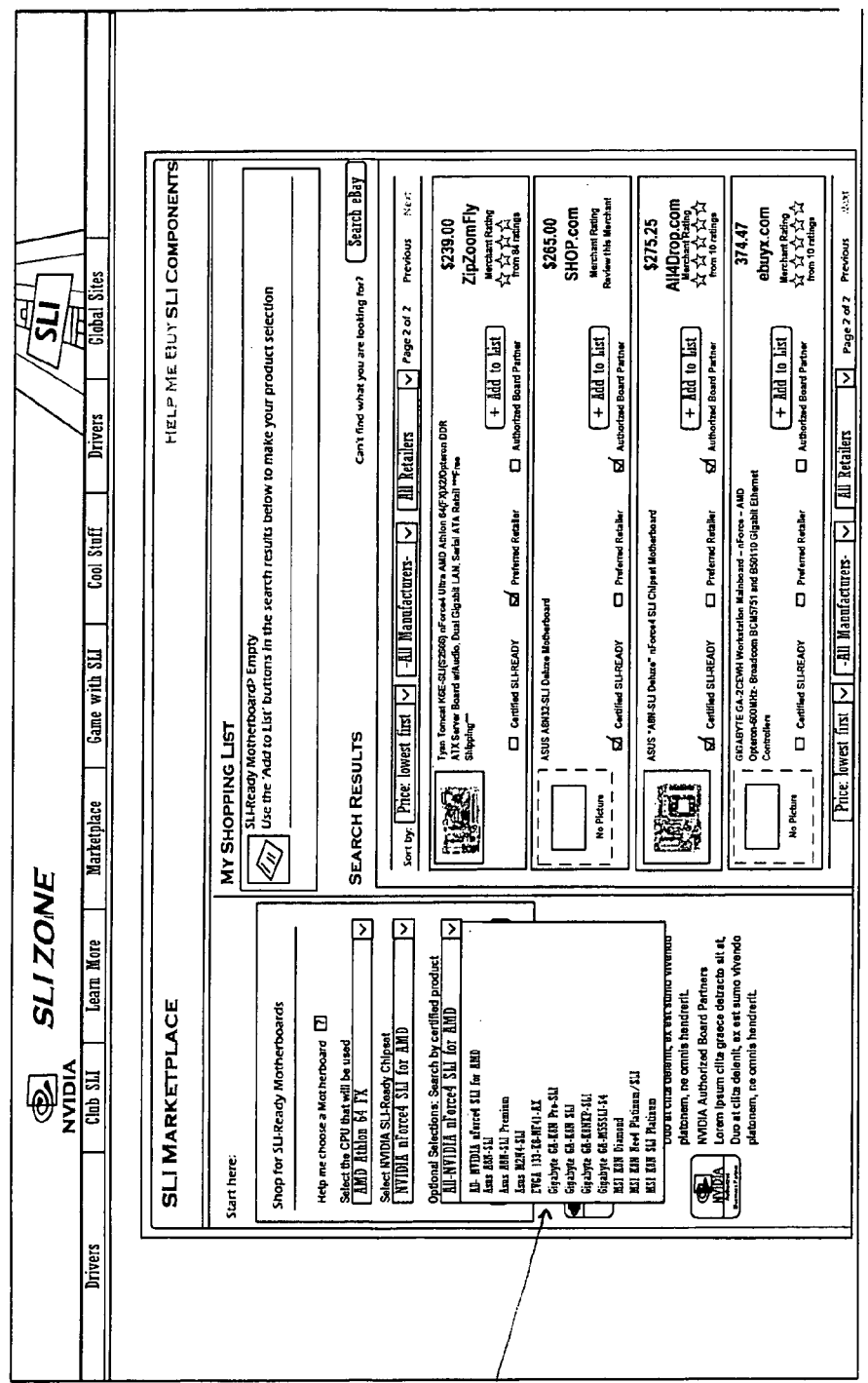
FIG. 10 shows a drop-down list that details a plurality of different options that further refine the product selection and/or product search criteria in accordance with one embodiment of the present invention.
Figure 11:
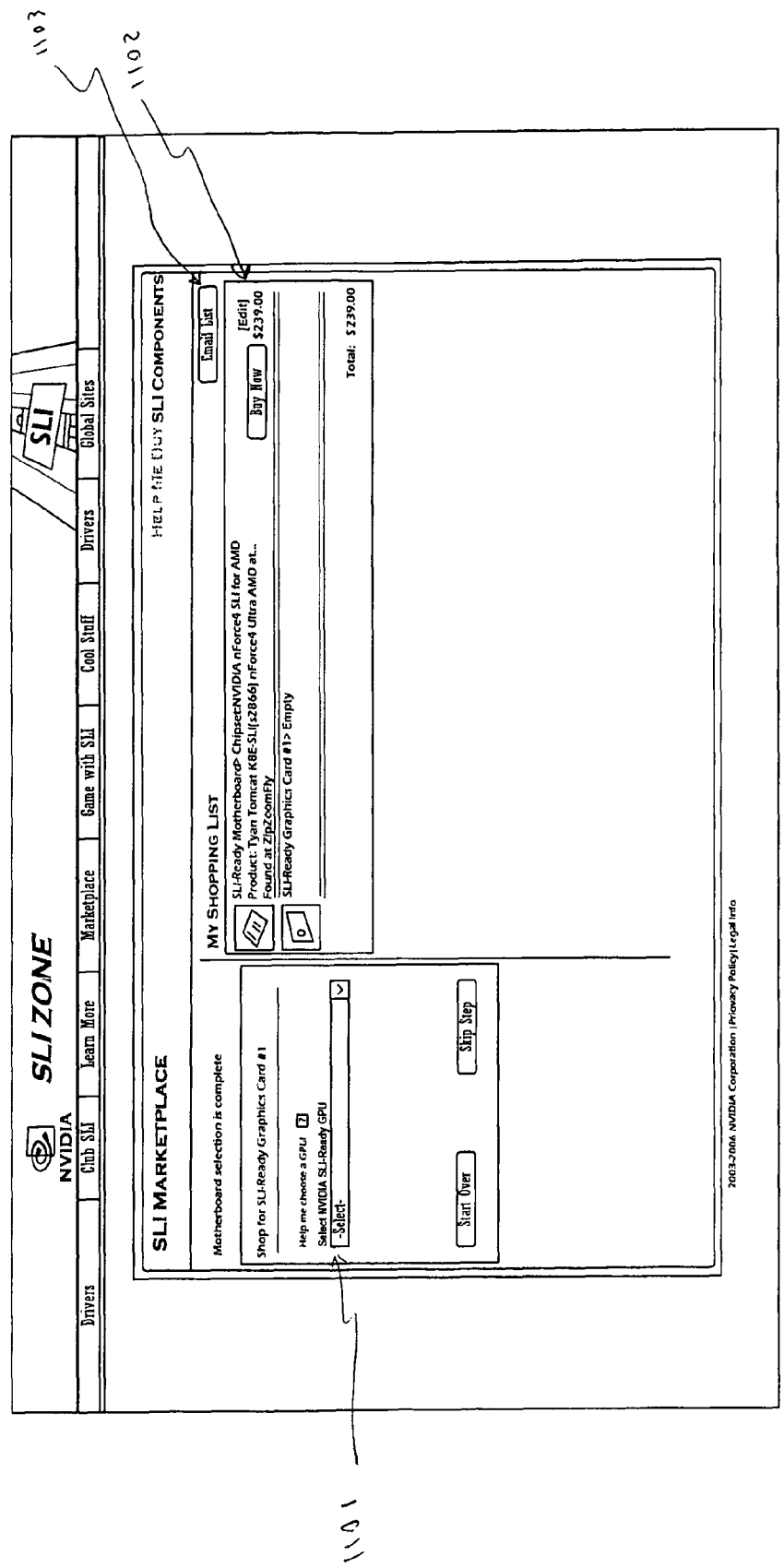
FIG. 11 shows a screen whereby the user now presented with options for a particular graphics card that is compatible with the prior selections in accordance with one embodiment of the present invention.

FIG. 10 shows a drop-down list 1001 that details a plurality of different options that further refine the product selection and/or product search criteria. These different options each depend upon the compatibility requirements of the previously selected options in FIG. 7 through FIG. 9. FIG. 11 shows a screen whereby the user is now presented with options 1101 for a particular graphics card that is compatible with the prior selections. The entry 1102 shows the result of clicking "add to list" for the prior motherboard selection. As described above, the user can now buy the individual product from a specific electronic retailer, out of a plurality of such retailers, or can send a list to themselves, for example, for later shopping (e.g., button 1103).

Figure 12:
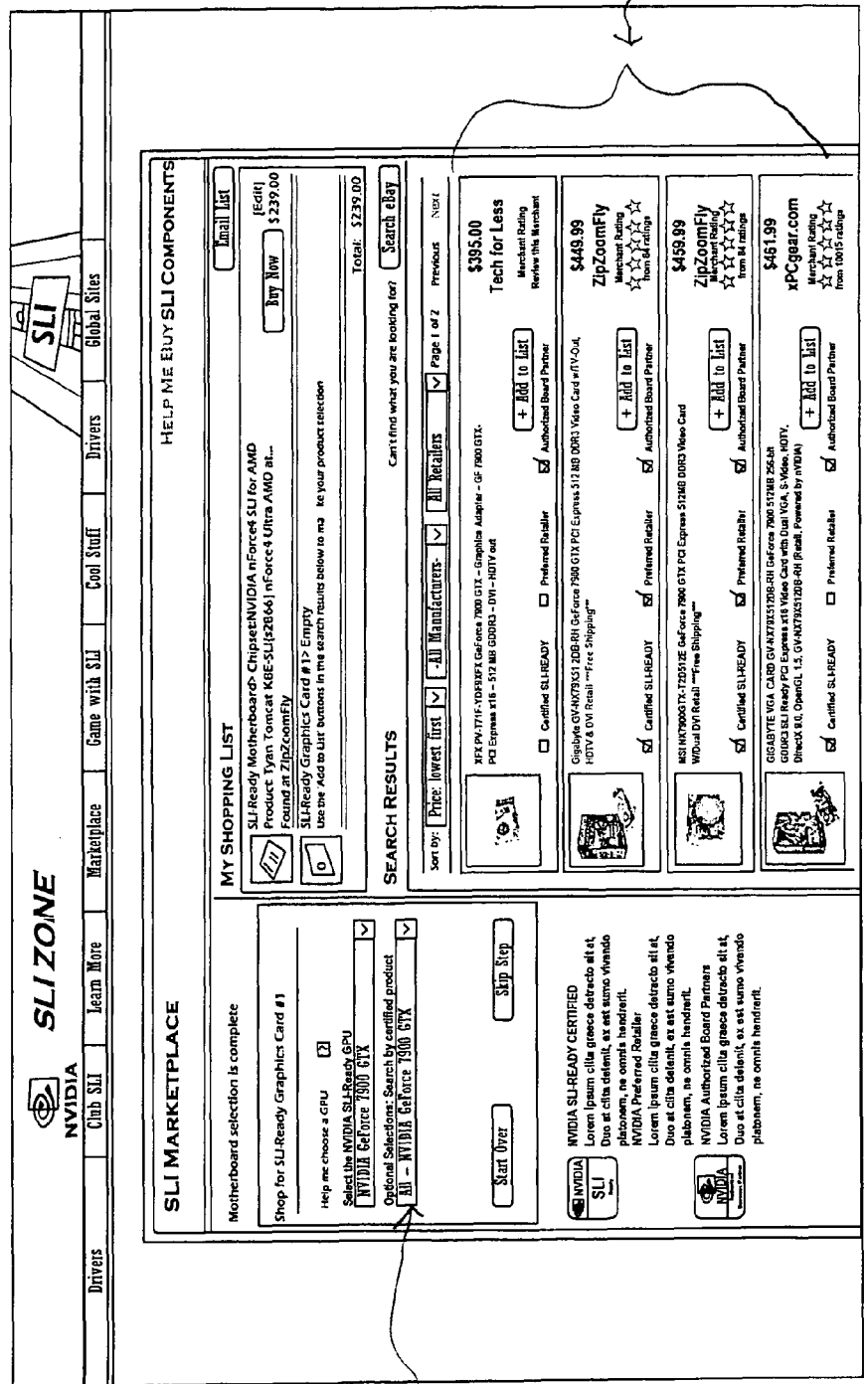
FIG. 12 shows further graphics card child product selections and a plurality of different results and respective descriptive information for each result in accordance with one embodiment of the present invention.
Figure 13:
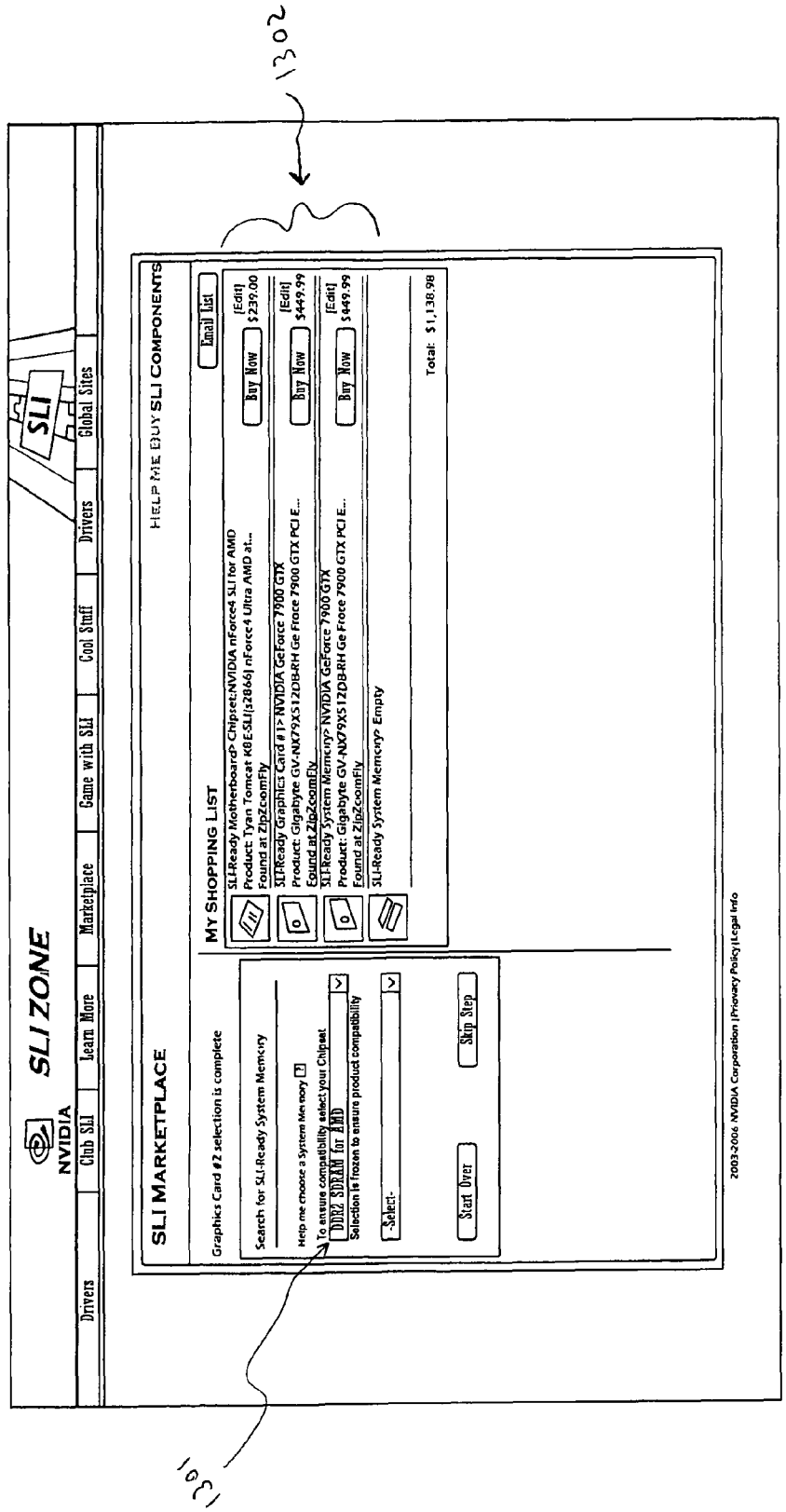
FIG. 13 shows memory child products based on the previous product selections in accordance with one embodiment of the present invention.
Figure 14:
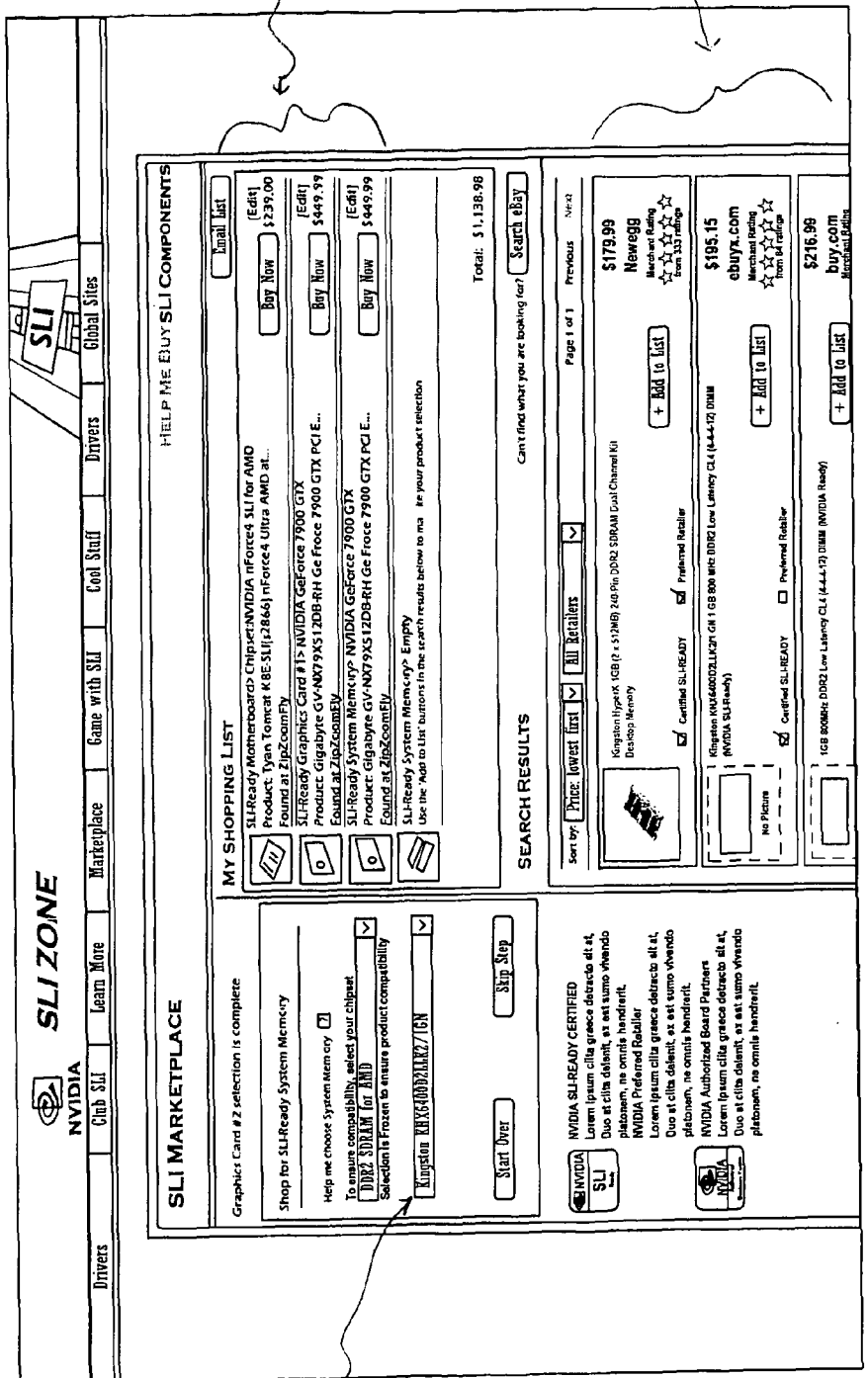
FIG. 14 shows a selected memory, previously selected products, and results describing each of the products in accordance with one embodiment of the present invention.

FIG. 12 shows further graphics card child product selections (e.g., box 1201) and a plurality of different results 1202 and respective descriptive information for each result (e.g., price, vendor, manufacturer make and model, specifications, etc.). One of the results 1202 can optionally be highlighted as a recommended choice to provide further guidance to the user. FIG. 13 shows memory child products (e.g., box 1301) based on the previous product selections. The results 1302 show the prior products that have been selected. FIG. 14 shows the selected memory 1403, the previously selected products 1401, and the results 1402 describing each of the products in the same manner as for the prior products described above.

Figure 15:
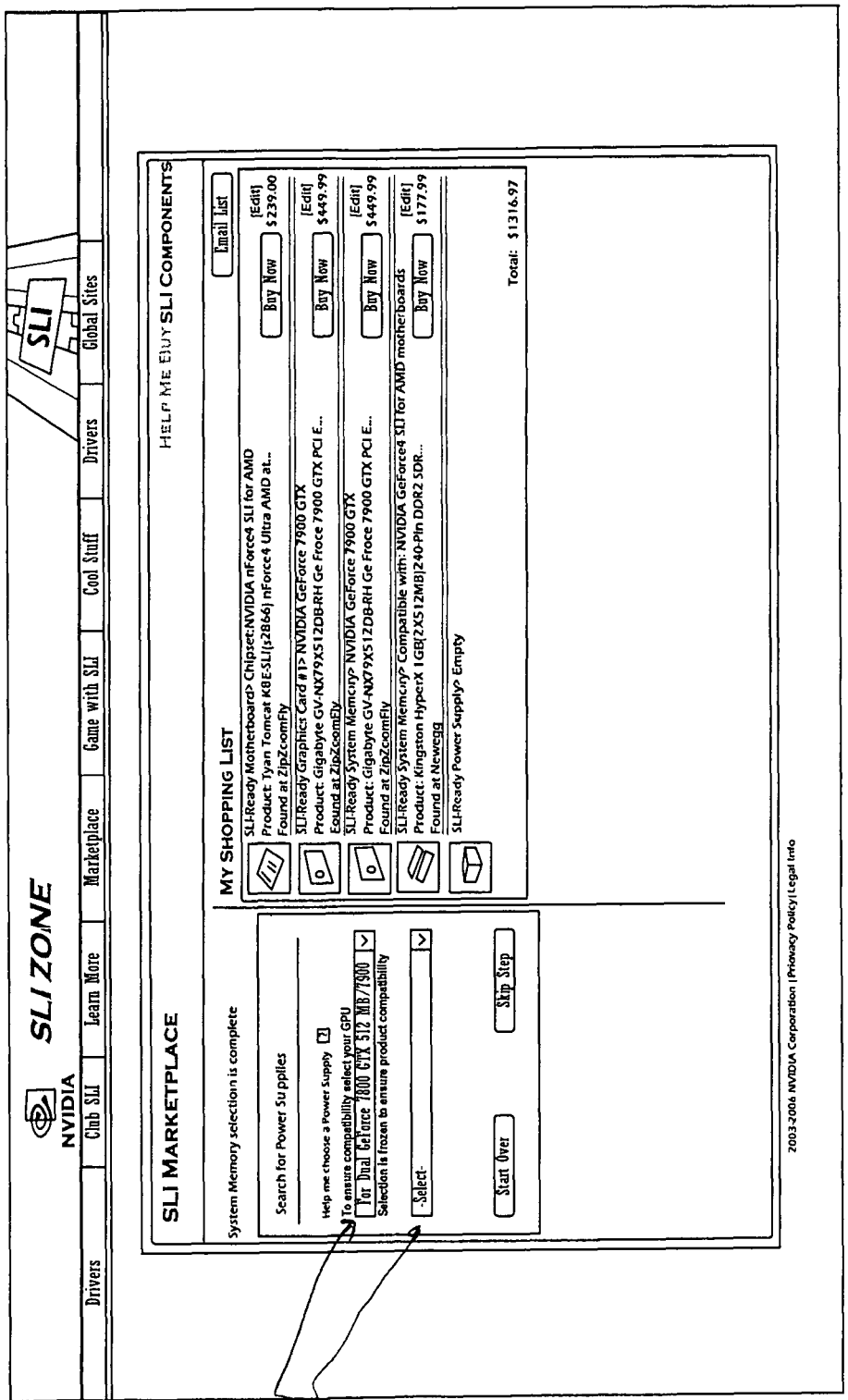
FIG. 15 shows process guiding a user through the selection of different power supply options in accordance with one embodiment of the present invention.
Figure 16:
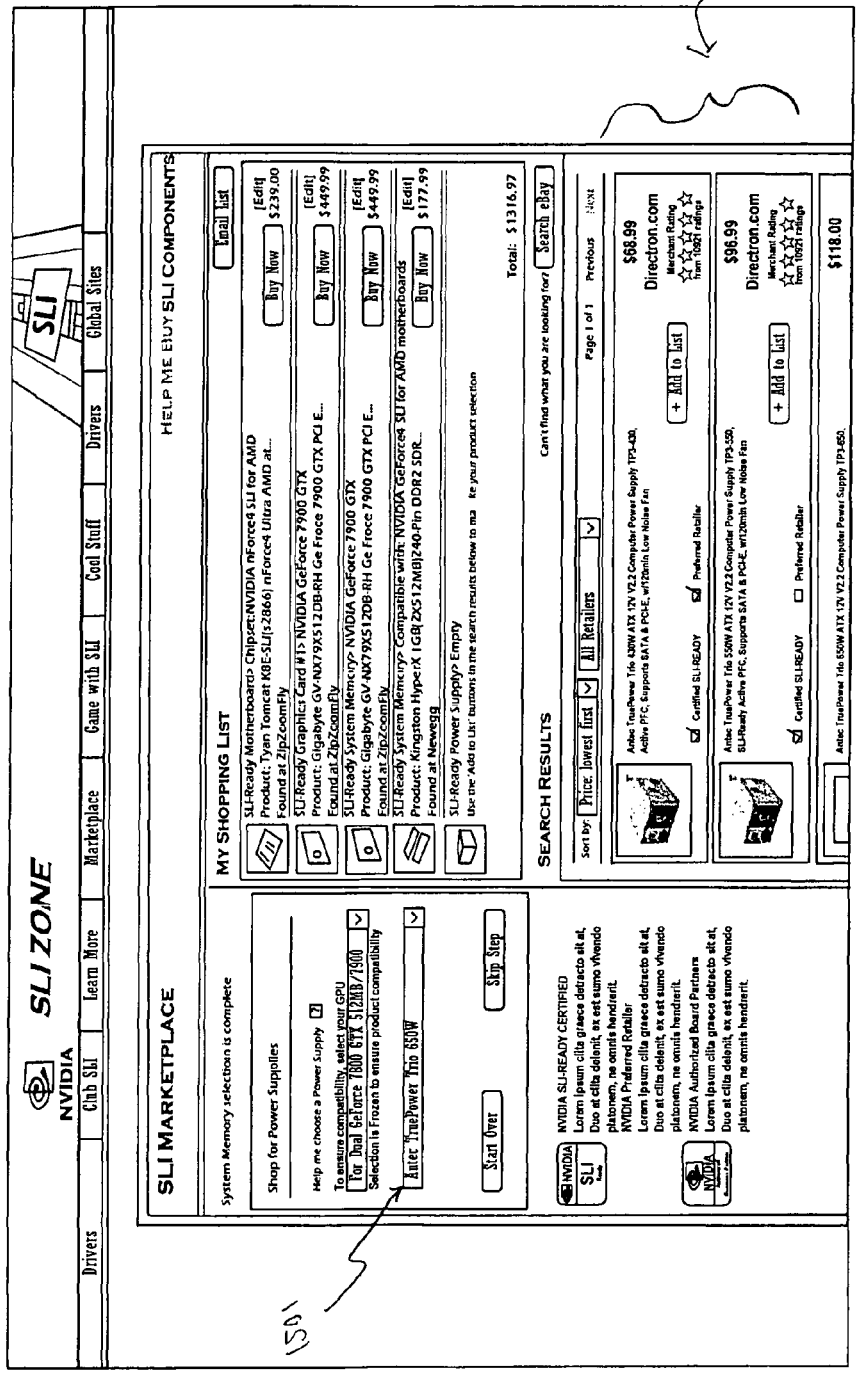
FIG. 16 shows results corresponding to the chosen power supply option in accordance with one embodiment of the present invention.

FIG. 15 shows process 600 guiding a user through the selection of different power supply options (e.g., box 1501). As with the prior selections, the power supply options 1501 are compatible with the prior selected parent products. Subsequently, as shown by FIG. 16, the results 1601 corresponding to the chosen power supply option 1501 are shown.

Figure 17:
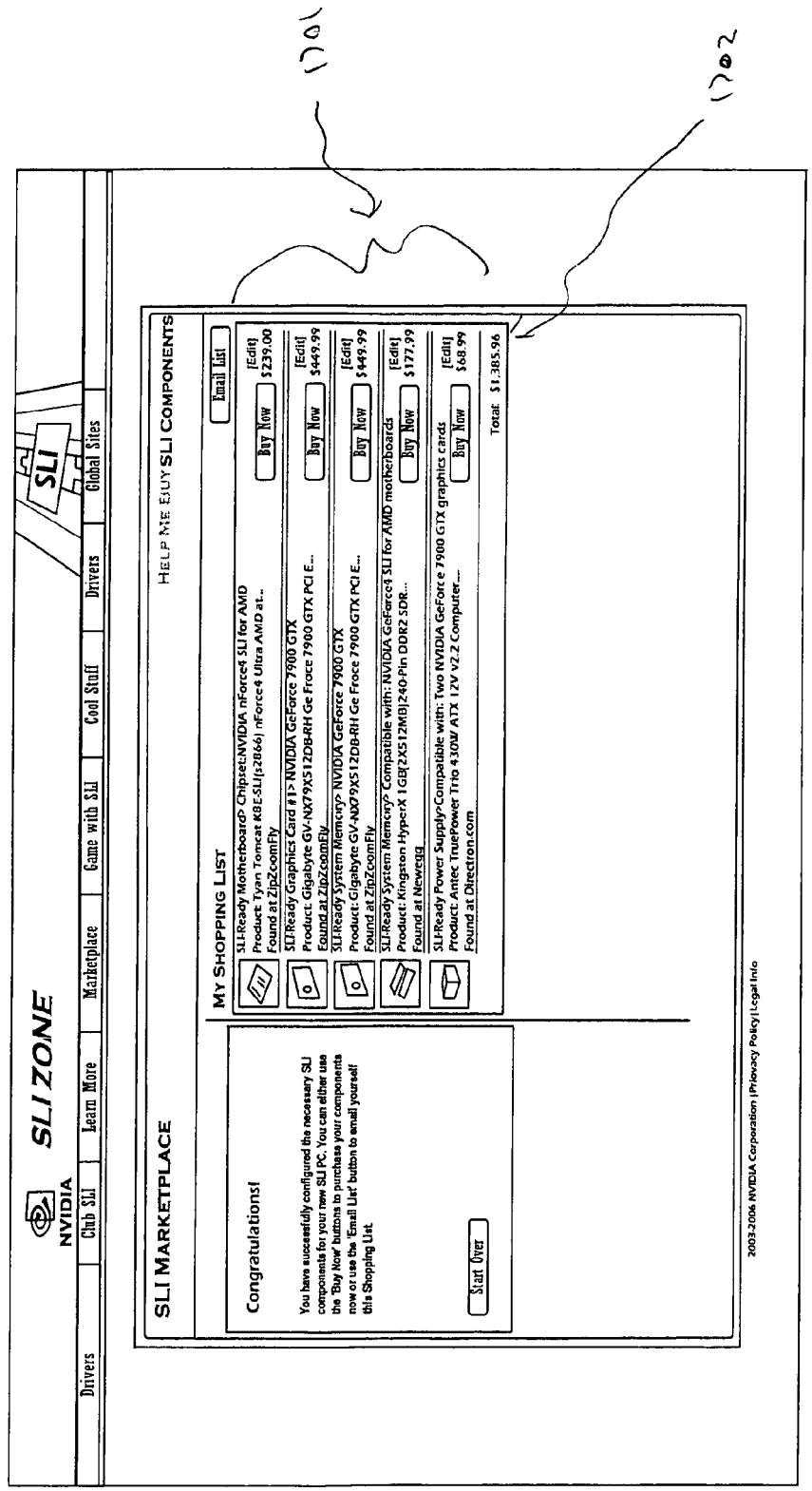
FIG. 17 shows a list detailing all of the selected products chosen by the user as guided by a guided configuration/selection process in accordance with one embodiment of the present invention.
Figure 18:
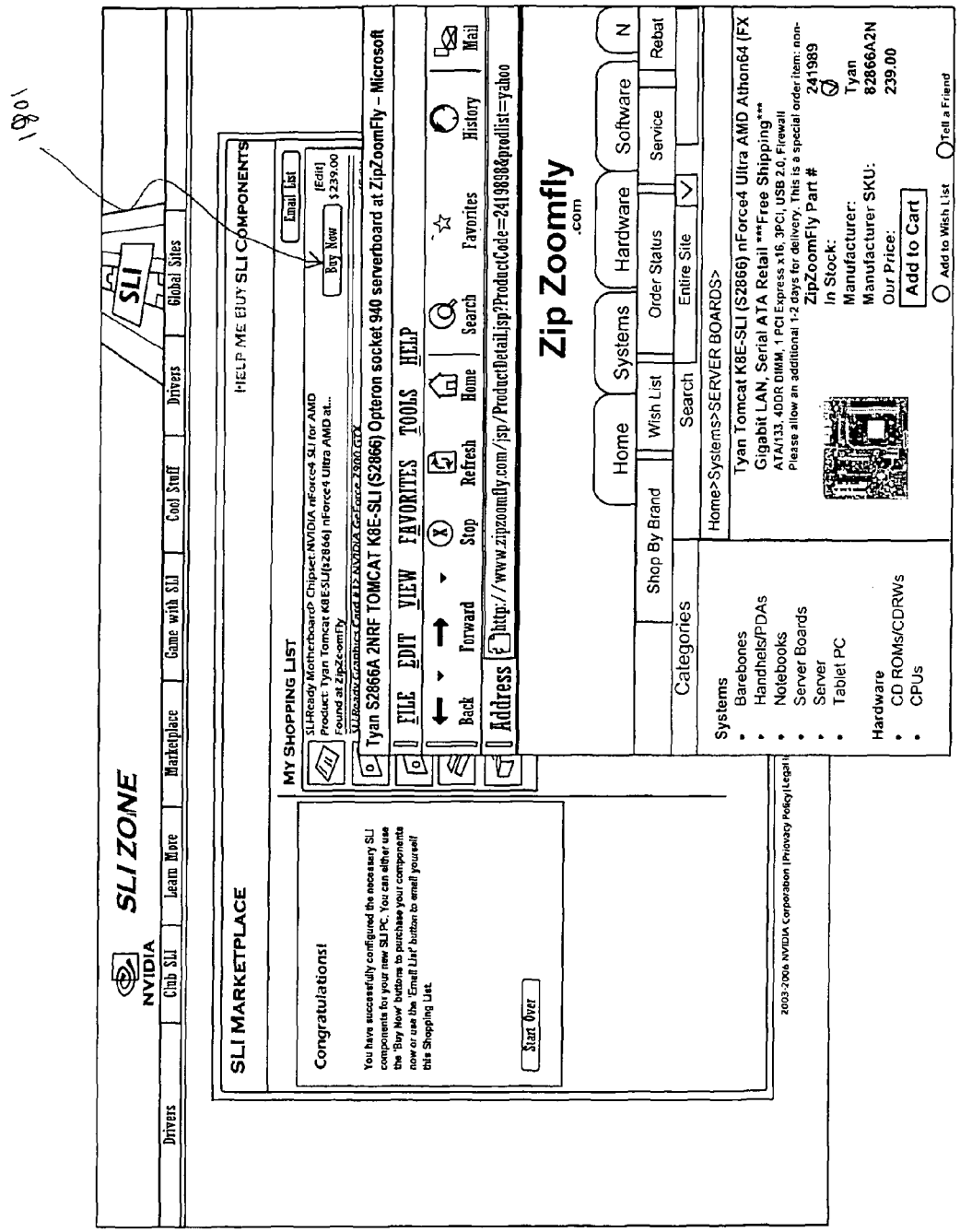
FIG. 18 shows a web page invoked by the user which brings up a web page of a vendor for a specific product in accordance with one embodiment of the present invention.

Finally, FIG. 17 shows a list 1701 detailing all of the selected products chosen by the user as guided by the process 600. The list can show a total price 1702 of all of the selected products. The user can now buy the individual components directly (as shown in FIG. 18) or can e-mail the entire list to themselves or to someone else for later shopping, or the like. FIG. 18 shows a web page invoked by the user pressing the button 1801, which brings up a web page of the vendor for the specific product, thereby allowing the user to easily purchase the product.

In this manner, embodiments of the present invention provide an electronic-commerce method and system that gives customers the benefits of purchasing specialized components for complex systems such as desktop computer systems, while avoiding the potential pitfalls of making mistakes in the component selection process. As shown by process 600 and by FIG. 7 through FIG. 18, multiple e-commerce agents can be directly compared to find the best inventory availability, the best warranty, the best price, or the like, while preventing the user from making any component miss-choices or miss-selections, and while not requiring the customer to perform extensive research or enlist the help of more technically minded friends.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for hierarchical product selection and purchasing from a server, comprising:
    accessing a plurality of products from a plurality of component subareas, wherein the plurality of products are for an assembly of a computer system by a user, and wherein each of the component subareas have corresponding compatibility constraints with respect to other component subareas;
    generating a hierarchical presentation of the products, wherein the presentation proceeds from a parent product out of the plurality of products to a child product out of the plurality of products;
    providing the hierarchical presentation of the products to a client computer system via a Web browser hosted on the client computer system, wherein the presentation is configured to show child component subareas that satisfy compatibility restraints with parent component subareas; and
    accepting an order for the at least one product of the plurality of products and implementing the order with a corresponding e-commerce agent for the at least one product.

2. The method of claim 1, wherein the e-commerce agent is an electronic retailer.

3. The method of claim 1, where the e-commerce agent is an electronic retailer/broker.

4. The method of claim 1, wherein one of the component subareas comprises motherboards.

5. The method of claim 4, wherein one of the component subareas comprises graphics cards.

6. The method of claim 5, wherein one of the component subareas comprises CPUs.

7. The method of claim 1, wherein the presentation provided via the Web browser includes descriptive information regarding the parent component and a highlighted one of a plurality of child components.

8. The method of claim 7, wherein the descriptive information includes performance information.

9. The method of claim 7, wherein the descriptive information includes e-commerce agent inventory information and price information.

10. The method of claim 7, wherein the descriptive information includes a link for accepting the order for the highlighted child component.

11. The method of claim 1, wherein the e-commerce agent further comprises a plurality of e-commerce agents that provide the at least one product for sale.

12. A server computer system for implementing hierarchical product selection and purchasing, comprising:
    a server having a processor coupled to a memory, the memory having computer readable code which when executed by the processor causes the server to:
        access a plurality of products from a plurality of component subareas, wherein the plurality of products are for an assembly of a computer system by a user, and wherein each of the component subareas have corresponding compatibility constraints with respect to other component subareas;
        generate a hierarchical presentation of the products, wherein the presentation proceeds from a parent product out of the plurality of products to a child product out of the plurality of products;
        provide the hierarchical presentation of the products to a client computer system via a Web browser hosted on the client computer system, wherein the presentation is configured to show child component subareas that satisfy compatibility restraints with parent component subareas; and
        accept an order for the at least one product of the plurality of products and implementing the order with a corresponding e-commerce agent for the at least one product out of a plurality of e-commerce agents that provide the at least one product for sale.

13. The system of claim 12, wherein the e-commerce agent is an electronic retailer or an electronic retailer/broker.

14. The system of claim 12, wherein the component subareas include motherboards, graphics cards, and CPUs.

15. The system of claim 12, wherein the presentation provided via the Web browser includes descriptive information regarding the parent component and a highlighted one of a plurality of child components.

16. The system of claim 15, wherein the descriptive information includes performance information and price information.

17. The system of claim 16, wherein the descriptive information includes a link for accepting the order for the highlighted child component.

18. An e-commerce method for hierarchical product selection and purchasing, comprising:
    using a server computer system, accessing a plurality of products from a plurality of component subareas, wherein the plurality of products are for an assembly of a computer system by a user, and wherein each of the component subareas have corresponding compatibility constraints with respect to other component subareas, wherein the component subareas include motherboards, graphics cards, and CPUs;

generating a hierarchical presentation of the products, wherein the presentation proceeds from a parent product out of the plurality of products to a child product out of the plurality of products;

providing the hierarchical presentation of the products to a client computer system via a Web browser hosted on the client computer system, wherein the presentation is configured to show child component subareas that satisfy compatibility restraints with parent component subareas; and accepting an order for the at least one product of the plurality of products and implementing the order with a corresponding electronic retailer/broker for the at least one product out of a plurality of electronic retailer/brokers that provide the at least one product for sale.

19. The method of claim 18, wherein the component subareas include multi-GPU compatible motherboards, multi-GPU compatible graphics cards, and CPUs.

20. The method of claim 19, wherein the presentation provided via the Web browser includes descriptive information regarding the parent component and a highlighted one of a plurality of child components, wherein the descriptive information includes performance information and price information, and wherein the descriptive information includes a link for accepting the order for the highlighted child component.

* * * * *